United States Patent
Ryu et al.

(10) Patent No.: US 10,274,584 B2
(45) Date of Patent: Apr. 30, 2019

(54) APPARATUS AND METHOD FOR GENERATING BIDIRECTIONAL CHIRP SIGNAL BY USING PHASE ACCUMULATION POLYNOMIAL

(71) Applicant: KOREA AEROSPACE RESEARCH INSTITUTE, Daejeon (KR)

(72) Inventors: Sang Burm Ryu, Daejeon (KR); Jeong Hwan Yang, Daejeon (KR); Jong Pyo Kim, Daejeon (KR); Young Jin Won, Daejeon (KR); Young Jun Cho, Daejeon (KR); Chul Kang, Daejeon (KR); Sang Kon Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 379 days.

(21) Appl. No.: 15/103,145

(22) PCT Filed: Nov. 20, 2014

(86) PCT No.: PCT/KR2014/011219
§ 371 (c)(1),
(2) Date: Jun. 9, 2016

(87) PCT Pub. No.: WO2015/088157
PCT Pub. Date: Jun. 18, 2015

(65) Prior Publication Data
US 2016/0370457 A1    Dec. 22, 2016

(30) Foreign Application Priority Data
Dec. 9, 2013 (KR) .................. 10-2013-0152172

(51) Int. Cl.
*G01S 7/35* (2006.01)
*G01S 13/02* (2006.01)
*G01S 13/34* (2006.01)

(52) U.S. Cl.
CPC .............. *G01S 7/35* (2013.01); *G01S 7/354* (2013.01); *G01S 13/02* (2013.01); *G01S 13/345* (2013.01)

(58) Field of Classification Search
CPC ........ G01S 13/343; G01S 13/345; G01S 7/35; G01S 7/354; G01S 13/90; G01S 13/9035; G01S 13/9094
See application file for complete search history.

(56) References Cited

U.S. PATENT DOCUMENTS 5,274,380 A * 12/1993 Yatsuka ............. G01S 7/023
                                                  342/100
5,289,252 A *  2/1994 Nourrcier ........... G01S 7/497
                                                  356/28.5

(Continued)

FOREIGN PATENT DOCUMENTS

JP    2988396 B2    12/1999
JP    2003-515255 A   4/2003

(Continued)

OTHER PUBLICATIONS

International Search Report dated Feb. 24, 2015, issued in counterpart International Application No. PCT/KR2014/011219 (2 pages).

(Continued)

*Primary Examiner* — Peter M Bythrow
(74) *Attorney, Agent, or Firm* — Westerman, Hattori, Daniels & Adrian, LLP

(57) ABSTRACT

The present invention relates to an apparatus and method for generating a bidirectional chirp signal by using a phase accumulation polynomial, and the apparatus for generating a bidirectional chirp signal according to an embodiment may include an extraction unit extracting time interval information from the output of a frequency accumulator, a polynomial handling unit applying the phase accumulation polynomial to the extracted time interval information to generate (Continued)

a polynomial output value, and a bidirectional chirp signal output unit outputting a bidirectional chirp signal on the basis of the generated polynomial output value.

7 Claims, 6 Drawing Sheets

(56) References Cited

U.S. PATENT DOCUMENTS

| | | | | |
|---|---|---|---|---|
| 5,719,580 A | * | 2/1998 | Core | G01S 7/4008 342/100 |
| 5,815,111 A | * | 9/1998 | Gouenard | G01S 13/90 342/132 |
| 8,811,535 B2 | * | 8/2014 | Brodzik | G01S 13/003 365/151 |
| 2002/0027522 A1 | * | 3/2002 | Tullsson | G01S 7/023 342/196 |
| 2003/0151543 A1 | * | 8/2003 | Nakanishi | G01S 7/4008 342/70 |
| 2003/0184470 A1 | * | 10/2003 | Ishii | G01S 7/4008 342/174 |
| 2005/0001761 A1 | * | 1/2005 | Kliewer | G01S 7/352 342/174 |
| 2005/0003785 A1 | * | 1/2005 | Jackson | G01S 7/35 455/260 |
| 2008/0143583 A1 | * | 6/2008 | Welle | G01F 23/284 342/124 |
| 2009/0135403 A1 | * | 5/2009 | Aebischer | G01S 7/4915 356/5.1 |
| 2009/0278611 A1 | * | 11/2009 | Cloutier | H03C 3/0925 331/4 |
| 2009/0303111 A1 | * | 12/2009 | Cho | G01S 13/9035 342/25 A |
| 2010/0149023 A1 | * | 6/2010 | Cho | G01S 7/40 342/25 A |
| 2014/0159943 A1 | * | 6/2014 | Jaeger | G01S 7/354 342/90 |

FOREIGN PATENT DOCUMENTS

| | | |
|---|---|---|
| JP | 2011-127923 A | 6/2011 |
| JP | 2012-18058 A | 1/2012 |
| JP | 2012-168168 A | 9/2012 |
| KR | 10-2006-0127114 A | 12/2006 |
| KR | 10-1035267 B1 | 5/2011 |
| KR | 10-1092570 B1 | 12/2011 |

OTHER PUBLICATIONS

Notice of Allowance dated Nov. 17, 2014, issued in counterpart Korean Patent Application No. 10-2013-0152172 (5 pages).

* cited by examiner

APPARATUS AND METHOD FOR GENERATING BIDIRECTIONAL CHIRP SIGNAL BY USING PHASE ACCUMULATION POLYNOMIAL

TECHNICAL FIELD

Embodiments of the present invention relate to technology for generating a bidirectional chirp signal using a phase accumulation polynomial which may substitute for a phase accumulator in which a phase accumulation error occurs.

BACKGROUND ART

A synthetic aperture radar (SAR) system of a recent satellite requires a sub-meter image resolution and uses a bandwidth of over 500 MHz. Thus, a wideband chirp signal generator is needed to support a high-quality image resolution in the satellite. As a bandwidth increases, imbalance components generated in a radio frequency (RF) device decrease a quality of signal. To increase the quality of signal, a system having improved performance needs to be selected.

An ideal chirp signal refers to a signal in which a frequency changes linearly with time and a waveform has few errors caused by an insufficient number of representing bits and quantization noise.

A related art uses a memory map scheme to generate a chirp signal at a satellite. An ideal waveform is stored in a memory and generated using an address counter. However, as a signal bandwidth required for a high-resolution image increases, a required memory increases and it takes a time to switch the waveform. Research is being actively conducted to use a waveform generating method using a direct digital synthesizer (DDS) requiring a small memory and providing a fast switching speed. When the DDS is used, a linearity of an amplitude or phase may not be maintained due to the quantization error and a phase truncation error as a high frequency is generated. A pure waveform of a chirp signal to be used for satellite observation is significant. When such issues occur, a cost may increase, and thus a frequency to be generated may be restricted.

To generate a chirp signal using a DDS, as shown in FIG. 1, a timing logic may be configured based on a chirp rate and a system clock, and a chirp signal may be generated within a lamp timing signal corresponding to the chirp rate. Further, a control word for a start frequency and an end frequency of the chirp signal may be set, and a frequency step may be calculated and set to increase the frequencies based on the chirp rate. To adjust the phase and amplitude of the generated chirp signal, an adder and a multiplier may be used for a phase accumulator and a phase-to-amplitude converter, respectively.

The technology of FIG. 1 to be used for an imaging radar is suitable for generating an up-chirp signal and a down-chirp signal. However, in a case of generating a bidirectional chirp signal, a start phase of a waveform may be fixed. Thus, in a case of generating a waveform the same as the ideal chirp signal, phases may not match. The bidirectional chirp signal in which an up-chirp signal and a down-chirp signal coexist requires a time parameter which starts with a negative sign. When a control word with a negative sign is input into a DDS, the generated signal may be inverted 180 degrees. Further, in general, a phase is corrected using a complement of "2". However, since an output phase of the DDS starts from "0", an unnecessary error may occur. To compensate for the error, a number of complex exceptions are to be processed, and input information may need to be configured by performing an operation with respect to each waveform to be generated using an external processor. In particular, a phase offset value to be used to adjust the phase may be calculated differently depending on a characteristic of a target signal, and a definite method therefor has not been suggested.

DISCLOSURE OF INVENTION

Technical Solutions

According to an aspect of the present invention, there is provided an apparatus for generating a bidirectional chirp signal, the apparatus including an extractor configured to extract time spacing information from an output of a frequency accumulator a polynomial processor configured to generate a polynomial output value by applying a phase accumulation polynomial to the extracted time spacing information, and a bidirectional chirp signal outputter configured to output a bidirectional chirp signal based on the generated polynomial output value.

The extractor may be configured to extract the time spacing information from time spacing values of an ideal chirp signal.

The extractor may be configured to extract the time spacing information based on at least one of a clock frequency, a sampling frequency, or a pulse width of a control word generated by the frequency accumulator.

The polynomial processor may be configured to generate the polynomial output value with respect to the phase accumulation polynomial based on at least one of a phase offset value, a start phase, a start frequency, a chirp rate, or the time spacing information.

The apparatus may further include a multiplexer configured to generate a plurality of out-of-phase signals from the output of the frequency accumulator.

The extractor may be configured to extract items of time spacing information from the out-of-phase signals, the polynomial processor may be configured to generate polynomial output values by applying the phase accumulation polynomial to each of the extracted items of time spacing information, and the bidirectional chirp signal outputter may be configured to output the bidirectional chirp signal based on the generated polynomial output values.

The bidirectional chirp signal outputter may be configured to output the bidirectional chirp signal based on a predetermined polynomial output value selected from the generated polynomial output values.

According to another aspect of the present invention, there is also provided a method of generating a bidirectional chirp signal, the method including extracting, by an extractor, time spacing information from an output of a frequency accumulator, generating, by a polynomial processor, a polynomial output value by applying a phase accumulation polynomial to the extracted time spacing information, and outputting, by a bidirectional chirp signal outputter, a bidirectional chirp signal based on the generated polynomial output value.

The extracting may include extracting the time spacing information from time spacing values of an ideal chirp signal.

The extracting may include extracting the time spacing information based on at least one of a clock frequency, a sampling frequency, or a pulse width of a control word generated by the frequency accumulator.

The generating may include generating the polynomial output value with respect to the phase accumulation polynomial based on at least one of a phase offset value, a start phase, a start frequency, a chirp rate, or the time spacing information.

The method may further include generating, by a multiplexer, a plurality of out-of-phase signals from the output of the frequency accumulator. The extracting may include extracting items of time spacing informatinon from the out-of-phase signals, the generating of the polynomial output value may include generating polynomial output values by applying the phase accumulation polynomial to each of the extracted items of time spacing information, and the outputting may include outputting the bidirectional chirp signal based on the generated polynomial output values.

The outputting may include outputting the bidirectional chirp signal based on a predetermined polynomial output value selected from the generated polynomial output values.

BEST MODE FOR CARRYING OUT THE INVENTION

Figure 1:
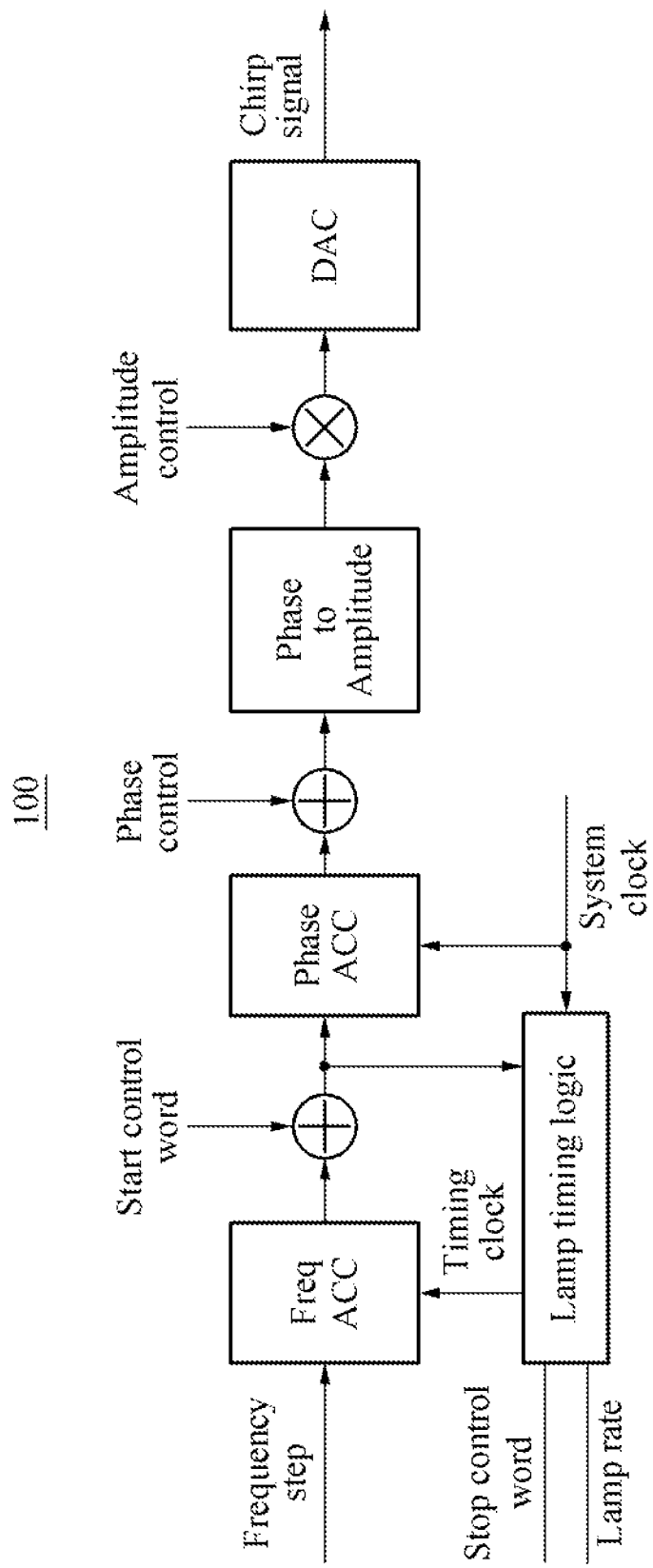
FIG. 1 illustrates technology for generating a chirp signal using a direct digital synthesizer (DDS).

Hereinafter, reference will now be made in detail to embodiments of the present invention, examples of which are illustrated in the accompanying drawings.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification. In the drawings, like reference numerals refer to the like elements throughout.

Differences between the present invention and the related art will be clarified through the detailed description and the scope of the claims with reference to the accompanying drawings. In particular, the present invention is well pointed out and clearly claimed in the claims. The present invention, however, may be best appreciated by referring to the following detailed description with reference to the accompanying drawings. In the drawings, like reference numerals refer to like elements throughout.

Figure 2:
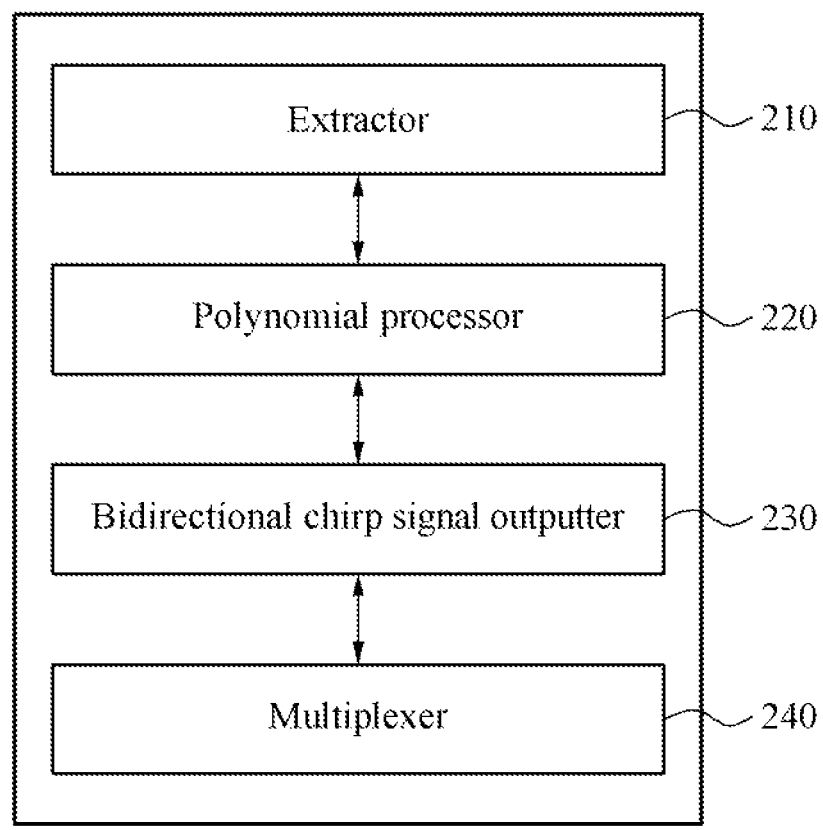
FIG. 2 illustrates an apparatus for generating a bidirectional chirp signal according to an embodiment of the present invention.

FIG. 2 illustrates an apparatus for generating a bidirectional chirp signal according to an embodiment of the present invention.

An apparatus 200 for generating a bidirectional chirp signal according to an embodiment of the present invention may adjust a generated signal to have a waveform similar to an ideal waveform by replacing a phase accumulator of a chirp signal generator using a direct digital synthesizer (DDS) with a polynomial processor configured to process a phase accumulation polynomial. Further, the apparatus 200 for generating a bidirectional chirp signal may be applied to a parallel DDS scheme that generates and multiplexes a plurality of out-of-phase waveforms, thereby extending a digital signal band the same as an ideal chirp signal and with an improved performance.

The ideal chirp signal may be interpreted as a theoretical chirp signal in which a phase truncation error or an error caused by an occurrence of quantization noise or spurious does not occur.

To achieve the foregoing, the apparatus 200 for generating a bidirectional chirp signal may include an extractor 210, a polynomial processor 220, a bidirectional chirp signal outputter 230, and a multiplexer 240.

The extractor 210 may extract time spacing information from an output of a frequency accumulator. The polynomial processor 220 may generate a polynomial output value by applying a phase accumulation polynomial to the extracted time spacing information.

For example, the extractor 210 may extract only the time spacing information at an output terminal of the frequency accumulator. If the time spacing information is the same as a time spacing used for the ideal chirp signal, the phase accumulation polynomial to which a chirp rate is applied may be used at a subsequent terminal, rather than the phase accumulator. In doing so, an output value without a phase error caused by a truncation error may be input into a phase-to-amplitude converter.

The bidirectional chirp signal outputter 230 may output a bidirectional chirp signal based on the generated polynomial output value. Since the phase accumulation polynomial to which the chirp rate is applied is used, rather than the phase accumulator, the output of the bidirectional chirp signal outputter 230 may be almost the same as the ideal chirp signal and have similar spectrum characteristics and impulse response characteristics at a receiving terminal. Further, a fewer number of devices may be used when compared to the phase accumulator provided in a pipeline structure. For example, when a multiplication circuit is added to an output terminal of the frequency accumulator, a faster band switching speed may be provided. Thus, the advantages of the DDS and the memory map scheme may be expected.

The apparatus 200 for generating a bidirectional chirp signal may further include the multiplexer 240. The multiplexer 240 may generate a plurality of out-of-phase signals from the output of the frequency accumulator. The extractor 210 may extract items of time spacing information from the out-of-phase signals. The polynomial processor 220 may generate polynomial output values by applying the phase accumulation polynomial to each of the extracted items of time spacing information. The bidirectional chirp signal outputter 230 may output the bidirectional chirp signal based on the generated polynomial output values. In this example, the bidirectional chirp signal outputter 230 may output the bidirectional chirp signal based on a predetermined polynomial output value selected from the generated polynomial output values.

Figure 3:
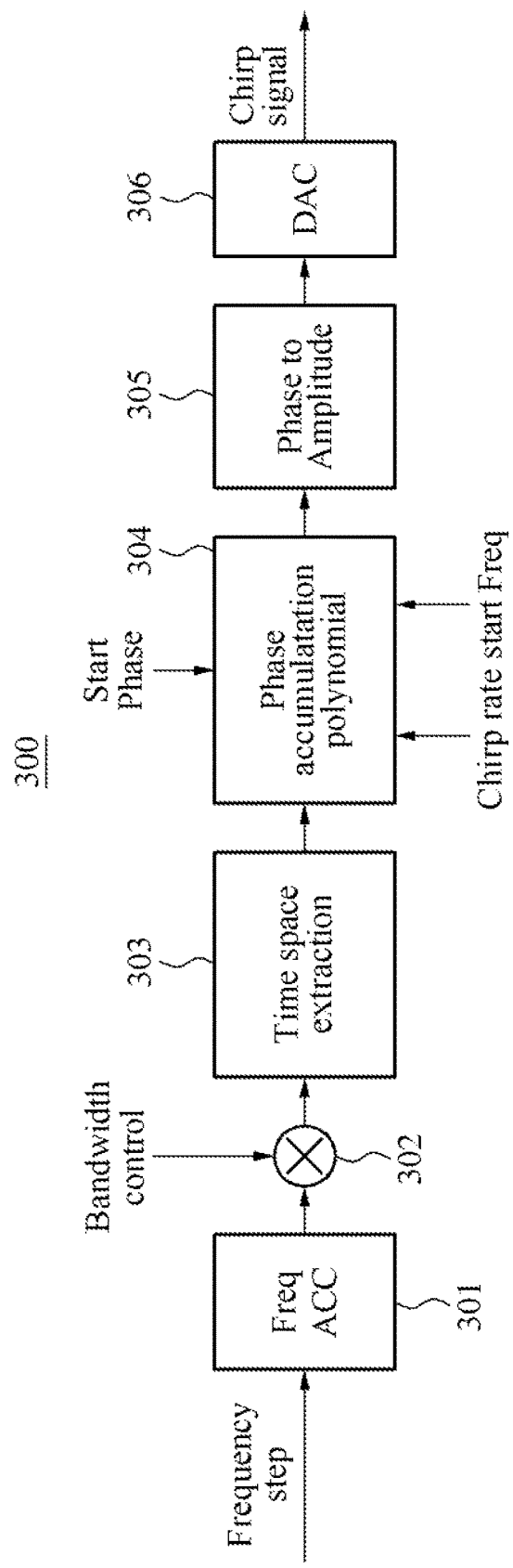
FIG. 3 illustrates an apparatus for generating a bidirectional chirp signal according to an embodiment of the present invention in detail.

FIG. 3 illustrates an apparatus 300 for generating a bidirectional chirp signal according to an embodiment of the present invention in detail.

The apparatus 300 for generating a bidirectional chirp signal may extract only time spacing information through an extractor 303 at an output terminal of a frequency accumulator 301. If the extracted time spacing information is the same as a time spacing used for an ideal chirp signal, a phase accumulator may not need to be used at a subsequent terminal. In detail, a polynomial processor 304 may output data without a phase error caused by a truncation error using the phase accumulation polynomial to which a chirp rate is applied, and input the output data into a phase-to-amplitude converter 305. Thus, an output of the phase-to-amplitude converter 305 may be almost the same as the ideal chirp signal and have similar spectrum characteristics and impulse response characteristics at a receiving terminal.

Since the apparatus 300 for generating a bidirectional chirp signal uses the polynomial processor 304, a fewer number of devices may be used when compared to a phase accumulator provided in a pipeline structure. In addition, when a multiplier 302 is added to the output terminal of the frequency accumulator 301, the apparatus 300 for generating a bidirectional chirp signal may have a faster band switching speed.

Figure 4:
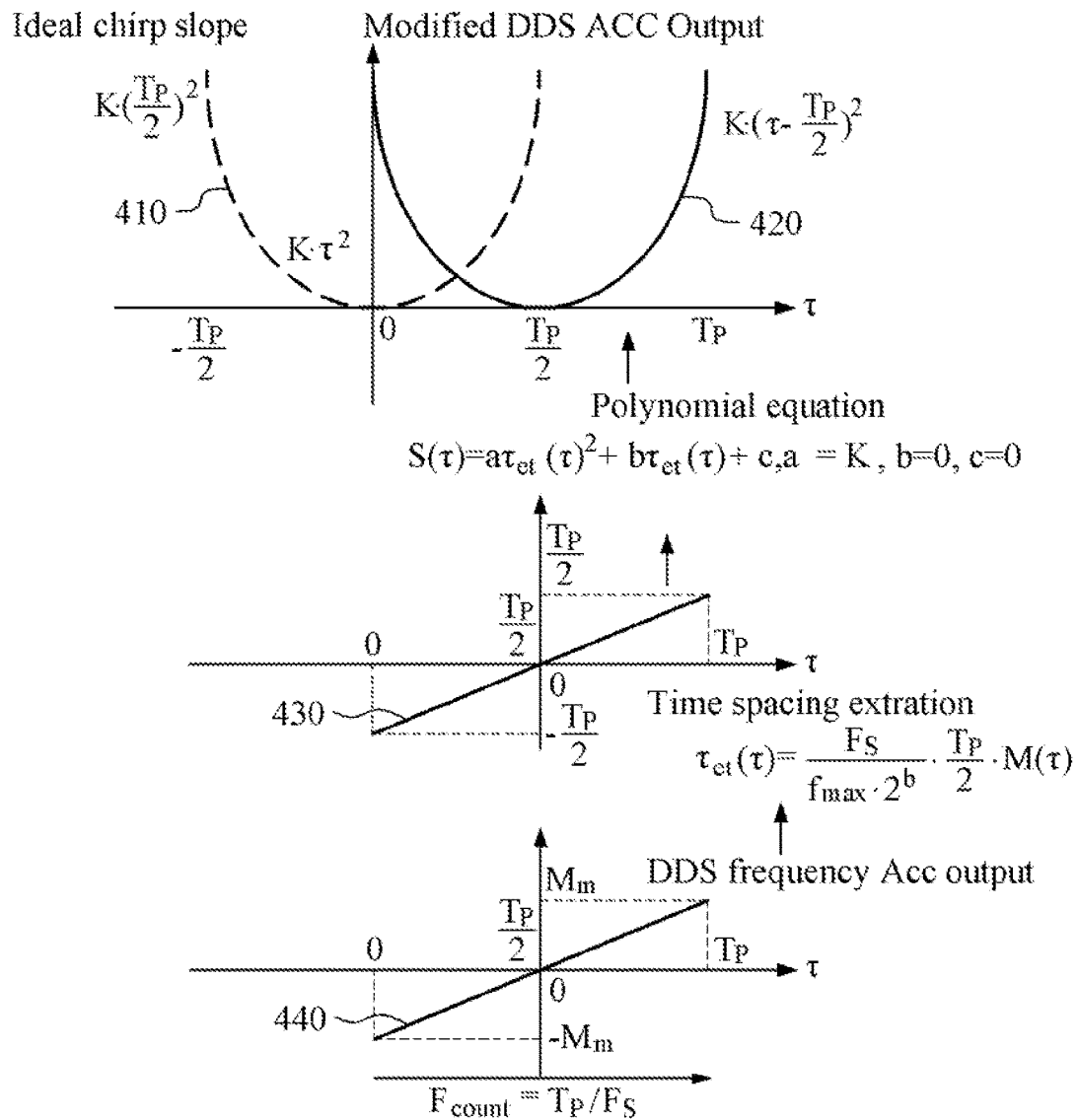
FIG. 4 illustrates an output of a polynomial processor using a phase accumulation polynomial according to an embodiment of the present invention.

FIG. 4 illustrates an output of a polynomial processor using a phase accumulation polynomial according to an embodiment of the present invention.

To replace an existing memory map type waveform generator with a DDS having a fast switching speed and operable using a small memory, errors may be reduced and many issues related to spectrum characteristics may occur. When an output of the waveform generator using the DDS is similar to an ideal chirp signal, the output may be regarded as a signal with a few truncation errors and spurious. Further, when the DDS is used, trial and error to occur may be reduced. Thus, herein, a polynomial processor configured to process a phase accumulation polynomial may be used as a substitute for a phase accumulator in which a phase accumulation error occurs.

As shown in FIG. 4, an ideal chirp signal 410 may be represented to be ideal in a symmetric form in the first and second quadrants. Further, only time spacing information 430 may be extracted from an output value 410 from a frequency accumulator. The extracted time spacing information 430 may be expressed by Equation 1.

$$\tau_{et}(\tau) = \frac{F_S}{f_{max} \cdot 2^b} \cdot \frac{T_P}{2} \cdot M(\tau) \quad \text{[Equation 1]}$$

In Equation 1, $T_p$ denotes a pulse width, and $F_s$ denotes a sampling frequency or a clock frequency. Further, $f_{max}$ denotes a maximum frequency generated and output from a waveform generator, and b denotes a number of used bits.

The extracted time spacing information 430 may be input into the phase accumulation polynomial. For example, the phase accumulation polynomial provided by the polynomial processor may be expressed by Equation 2.

$$S(\tau) = (a\tau_{et}(\tau)^2 + b\tau_{et}(\tau) + c) \cdot 2^{bit}, \ a=K, \ b=0, \ c=0 \quad \text{[Equation 2]}$$

In Equation 2, a may be interpreted as K, and the chirp rate K may be interpreted as signal bandwidth $B_R$/pulse width $T_p$, b denotes a start frequency, and c denotes a phase offset value which may be used when adjustment is needed. The phase accumulation polynomial provided by the polynomial processor has a start frequency of "0" and no phase offset value with the ideal chirp signal. Thus, both b and c may be "0".

When the time spacing information 430 is applied to the phase accumulation polynomial, an output value may be generated as expressed by Equation 3. Equation 3 may be interpreted as an output value 420 of the polynomial processor.

$$\phi_{et}(\tau) = K \cdot \tau_{et}^2 \cdot 2^{bit} = K\left(\tau - \left(\frac{T_p}{2}\right)^2\right) \cdot 2^{bit} \quad \text{[Equation 3]}$$

In Equation 3, $T_p$ denotes a pulse width, and the chirp rate K may be interpreted as signal bandwidth $B_R$/pulse width $T_p$.

Figure 5:
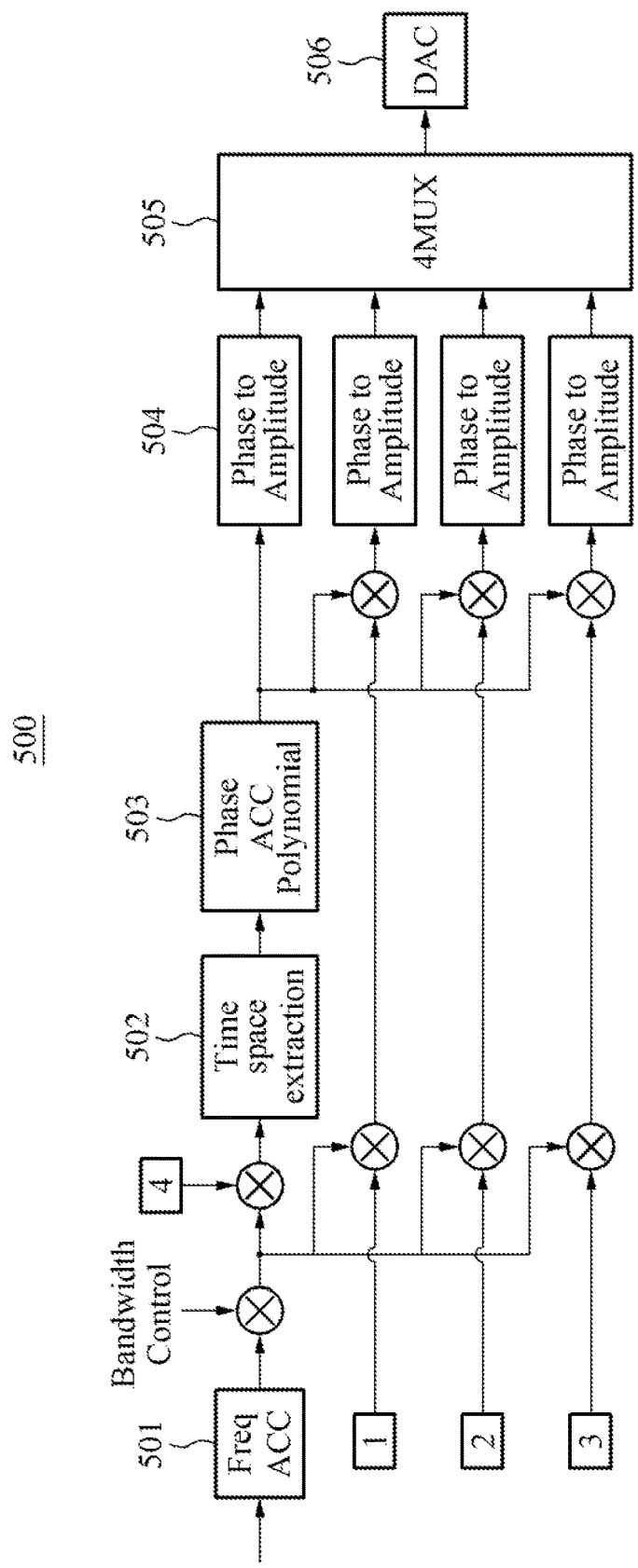
FIG. 5 illustrates an apparatus for generating a bidirectional chirp signal that generates a chirp signal using a phase accumulation polynomial, the apparatus being provided in a parallel structure.

FIG. 5 illustrates an apparatus 500 for generating a bidirectional chirp signal that generates a chirp signal using a phase accumulation polynomial, the apparatus 500 being provided in a parallel structure.

An output by the phase accumulation polynomial is almost the same as an ideal chirp signal and has similar spectrum characteristics and impulse response characteristics at a receiving terminal. Further, a fewer number of devices may be used when compared to a phase accumulator provided in a pipeline structure. By adding a multiplication circuit to an output terminal of a frequency accumulator, a faster band switching speed may be provided. Thus, by generating and multiplexing a plurality of out-of-phase waveforms to achieve the advantages of the DDS and the memory map scheme, a band of a wideband digital signal may extend further.

To achieve the foregoing, the apparatus 500 for generating a bidirectional signal may be provided in a parallel structure as shown in FIG. 5.

In a structure of a parallel DDS using an existing DDS, a phase difference caused by an error in a chirp signal generated by using a multiplication circuit at a front terminal of the phase accumulator may be increased by a number of multiplications, whereby the difference from the ideal chirp signal may increase further. However, by using the phase accumulation polynomial, the apparatus 500 for generating a bidirectional chirp signal may represent an increased resolution, thereby generating a chirp signal more similar to the ideal chirp signal.

In the apparatus 500 for generating a bidirectional chirp signal, as shown in Equation 4, when an extractor 502 multiplies, by "4", time spacing information extracted from an output of a frequency accumulator 501 and input a corresponding result into the phase accumulation polynomial, a polynomial processor 503 may output a signal as expressed by Equation 5.

In a case in which an output the same as the ideal chirp signal is desired, a phase offset may not need to be compensated for.

$$S_P(l) = 4 \tau_{et}^2(\tau) \cdot 2^b \quad \text{[Equation 4]}$$

In Equation 4, b denotes a number of used bits.

$$Y_{NP}(\tau) = \quad \text{[Equation 5]}$$

$$\sin(2\pi \cdot \phi_{NP}(\tau)/2^b) = \begin{cases} \sin(4K(\tau - T_P/2)^2), & T_0 \\ \sin(4K(\tau - T_P/2)^2 + K\tau), & T_1 \\ \sin(4K(\tau - T_P/2)^2 + 2K\tau), & T_2 \\ \sin(4K(\tau - T_P/2)^2 + 3K\tau), & T_3 \end{cases}$$

In Equation 5, $T_p$ denotes a pulse width, b denotes a number of used bits, and K denotes a chirp rate which may be interpreted as signal bandwidth $B_R$/pulse width $T_p$.

The output of the phase accumulation polynomial may be generated as multiple out-of-phase signals as expressed by Equation 5, and a quadruple high resolution and a quadruple band may extend without a phase error in a digital region through four phase-to-amplitude converters including a phase-to-amplitude converter 504, four multiplexers (4MUX) 505, and a digital-to-analog converter (DAC) 506.

In a structure using as single apparatus for generating a bidirectional chirp signal, a multiplication circuit is configured at an input terminal of a phase accumulation polynomial, whereby fast band switching may be performed. However, an error may occur at a rear terminal of a phase-to-amplitude converter. Thus, when the apparatus 500 for generating a bidirectional chirp signal, provided in the parallel structure, is used, an error to occur at the rear terminal of the phase-to-amplitude converter may be improved.

Figure 6:
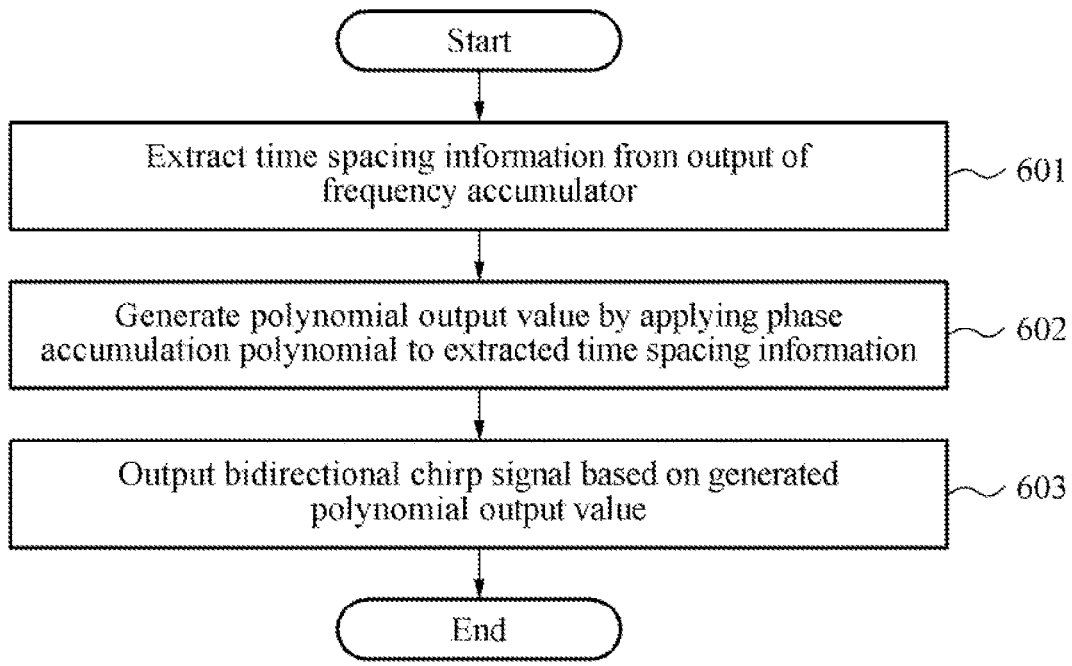
FIG. 6 illustrates a method of generating a bidirectional chirp signal according to an embodiment of the present invention.

FIG. 6 illustrates a method of generating a bidirectional chirp signal according to an embodiment of the present invention.

In operation 601, the method of generating a bidirectional chirp signal may extract time spacing information from an output of a frequency accumulator through an extractor. To extract the time spacing information from the output of the frequency accumulator the time spacing information may be extracted from time spacing values of an ideal chirp signal. For example, the method of generating a bidirectional chirp signal may extract the time spacing information based on at least one of a clock frequency a sampling frequency, or a pulse width of a control word generated by the frequency accumulator.

In operation 602, the method of generating a bidirectional chirp signal may generate a polynomial output value by applying a phase accumulation polynomial to the extracted time spacing information through a polynomial processor. For example, the method of generating a bidirectional chirp signal may generate the polynomial output value with respect to the phase accumulation polynomial based on at least one of a phase offset value, a start phase, a start frequency a chirp rate, or the time spacing information.

In operation 603, the method of generating a bidirectional chirp signal may output a bidirectional chirp signal based on the generated polynomial output value through a bidirectional chirp signal outputter.

The method of generating a bidirectional chirp signal may generate a plurality of out-of-phase signals from the output of the frequency accumulator. To achieve the foregoing, the method of generating a bidirectional chirp signal may extract items of time spacing information from the out-of-phase signals, and generate polynomial output values by applying the phase accumulation polynomial to each of the extracted items of time spacing information. Further, the method of generating a bidirectional chirp signal may output the bidirectional chirp signal similar to the ideal chirp signal based on the generated polynomial output values.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. An apparatus for generating a bidirectional chirp signal, the apparatus comprising:
    an extractor configured to extract time spacing information from an output of a frequency accumulator;
    a polynomial processor configured to generate a polynomial output value by applying a phase accumulation polynomial to the extracted time spacing information; and
    a bidirectional chirp signal outputter configured to output a bidirectional chirp signal based on the generated polynomial output value.

2. The apparatus of claim 1, wherein the extractor is configured to extract the time spacing information from time spacing values of an ideal chirp signal.

3. The apparatus of claim 1, wherein the extractor is configured to extract the time spacing information based on at least one of a clock frequency, a sampling frequency, or a pulse width of a control word generated by the frequency accumulator.

4. The apparatus of claim 1, wherein the polynomial processor is configured to generate the polynomial output value with respect to the phase accumulation polynomial based on at least one of a phase offset value, a start phase, a start frequency, a chirp rate, or the time spacing information.

5. The apparatus of claim 1, further comprising:
    a multiplexer configured to generate a plurality of out-of-phase signals from the output of the frequency accumulator.

6. The apparatus of claim 5, wherein the extractor is configured to extract items of time spacing information from the out-of-phase signals, the polynomial processor is configured to generate polynomial output values by applying the phase accumulation polynomial to each of the extracted items of time spacing information, and the bidirectional chirp signal outputter is configured to output the bidirectional chirp signal based on the generated polynomial output values.

7. The apparatus of claim 6, wherein the bidirectional chirp signal outputter is configured to output the bidirectional chirp signal based on a predetermined polynomial output value selected from the generated polynomial output values.

* * * * *